(12) United States Patent
Kipke et al.

(10) Patent No.: US 9,090,762 B2
(45) Date of Patent: Jul. 28, 2015

(54) POLYETHYLENE COMPOSITION SUITABLE FOR THE PREPARATION OF FILMS AND PROCESS FOR PREPARING THE SAME

(75) Inventors: Jennifer Kipke, Hamburg (DE);
Shahram Mihan, Bad Soden (DE);
Rainer Karer, Kaiserslautern (DE);
Jörg Auffermann, Freinsheim (DE);
Manfred Hecker, Neustadt Wied (DE);
Paulus De Lange, Wesseling (DE);
Harald Schmitz, Weinheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/301,495

(22) Filed: Nov. 21, 2011

(65) Prior Publication Data

US 2012/0065335 A1    Mar. 15, 2012

Related U.S. Application Data

(63) Continuation of application No. 12/085,539, filed as application No. PCT/EP2006/068444 on Nov. 14, 2006, now abandoned.

(60) Provisional application No. 60/749,791, filed on Dec. 13, 2005.

(30) Foreign Application Priority Data

Nov. 28, 2005  (EP) ..................................... 05025875

(51) Int. Cl.
*C08L 23/04*  (2006.01)
*C08L 23/08*  (2006.01)
*C08L 23/06*  (2006.01)

(52) U.S. Cl.
CPC ............. *C08L 23/04* (2013.01); *C08L 23/0815* (2013.01); *C08L 23/06* (2013.01); *C08L 2205/02* (2013.01); *C08L 2205/025* (2013.01); *C08L 2205/035* (2013.01); *C08L 2308/00* (2013.01); *C08L 2314/06* (2013.01)

(58) Field of Classification Search
CPC ......... C08L 23/00; C08L 23/04; C08L 23/06; C08L 23/08; C08L 23/0815; C08L 2308/00; C08L 2205/025; C08L 2207/066; C08L 2205/03; C08L 2314/06
USPC ................................................. 525/191, 240
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 6,114,456 A | 9/2000 | Dewart et al. | |
| 6,194,520 B1 | 2/2001 | Cheruvu et al. | |
| 6,426,384 B1 | 7/2002 | Nishimura et al. | |
| 6,828,395 B1 * | 12/2004 | Ehrman et al. | 526/114 |
| 6,878,454 B1 * | 4/2005 | Shannon et al. | 428/523 |
| 2003/0149180 A1 | 8/2003 | Van Dun et al. | |
| 2004/0214971 A1 * | 10/2004 | Gonioukh et al. | 526/227 |
| 2005/0137337 A1 | 6/2005 | Kwalk | |

FOREIGN PATENT DOCUMENTS

| | | |
|---|---|---|
| EP | 1584651 | 10/2005 |
| WO | WO-9704015 | 7/1996 |
| WO | WO-0162847 | 8/2001 |
| WO | WO-2005092973 | 10/2005 |
| WO | WO-2005/103095 | 11/2005 |

OTHER PUBLICATIONS

Wittcoff, Harold A. et al. Industrial Organic Chemicals $2^{nd}$ Edition John Wiley & Sons, Hoboken New Jersey, (2004) pp. 105-107.*
Ram, A. et al. Journal of Applied Polymer Science vol. 9 pp. 3225-3230 (1965).*
Chen, Yaofeng et al., "Halogen-Substituted 2,6-Bis(imino)pyridyl Iron and Cobalt Complexes: Highly Active Catalysts for Polymerization and Oligomerization of Ethylene", Organometallics, 2003, 22 2003, 4312-4321.
Bussink, Jan et al., "Polymer Blends", Ullmann's Encyclopedia of Industrial Chemistry, Sixth Edition (2000 Electronic Release) 2000, 1-36.
Holtrup, Wolfgang, "Zur Fraktionierung von Polymeren durch Direktextraktion", Makromol. Chem. 178 1977, 2335-2349.
Raff and Doak, "High Polymers", Interscience Publishers, John Wiley & Sons Vo. XX 1965, 442-443.

* cited by examiner

*Primary Examiner* — Irina S Zemel
*Assistant Examiner* — Jeffrey Lenihan

(57) ABSTRACT

A polyethylene composition, in particular suitable for the preparation of films, and a process for preparing the same are described. The polyethylene composition of the invention comprises from 50 to 89% by weight of a first polyethylene component comprising at least one multimodal polyethylene including a plurality of ethylene polymer fractions having distinct molecular weights and comonomer contents, at least one of said plurality of ethylene polymer fractions being prepared by the use of a single site catalyst, and from 50 to 11% by weight of a second polyethylene component comprising a low or medium density polyethylene.

8 Claims, No Drawings

US 9,090,762 B2

POLYETHYLENE COMPOSITION SUITABLE FOR THE PREPARATION OF FILMS AND PROCESS FOR PREPARING THE SAME

This application is a continuation of co-pending application Ser. No. 12/085,539, filed Nov. 10, 2008, which is the U.S. national phase of International Application PCT/EP2006/068444, filed Nov. 14, 2006, claiming priority to European Patent Application 05025875.5 filed Nov. 28, 2005, and the benefit under 35 U.S.C. 119(e) of U.S. Provisional Application No. 60/749,791, filed Dec. 13, 2005; the disclosures of co-pending application Ser. No. 12/085,539, International Application PCT/EP2006/068444, European Patent Application 05025875.5 and U.S. Provisional Application No. 60/749,791, each as filed, are incorporated herein by reference.

FIELD OF THE INVENTION

The present invention relates to a novel polyethylene composition, to a process for the preparation thereof, as well as to a film comprising such a polyethylene composition.

In the field of preparation of polyethylene films, particularly in the field of medium density (MDPE) and high density (HDPE) films, there is a long-felt need of providing films having, at the same time, a number of mechanical and physical properties, and in particular adequate mechanical strength, processability and transparency, which are normally conflicting with each other.

In the present description and in the following claims, the expression "medium density film" is used to indicate a film having a density ranging from above 0.930 to 0.940 $g/cm^3$, while the expression "high density film" is used to indicate a film having a density above 0.940 $g/cm^3$.

In polyethylene film applications, a possible way to evaluate the above-mentioned properties may be made through the following parameters which, in the present description and in the following claims, are defined and determined as specified hereinbelow.

The mechanical strength of a polyethylene film may be effectively evaluated, for example, by means of the dart drop impact, which gives a measure of the puncture resistance of a film under shock loading. In the present description and in the following claims, the dart drop will be referred to as determined by ASTM D 1709, Method A.

The processability of the composition on which the polyethylene film is based may be determined in terms of MFR according to standard ISO 1133, condition G, corresponding to a measurement performed at a temperature of 190° C. and under a weight of 21.6 kg.

The transparency of a polyethylene film may be expressed in terms of haze, gloss and/or of clarity. In the present description and in the following claims, the haze will be referred to as determined by ASTM D 1003-00 on a BYK Gardener Haze Guard Plus Device on at least 5 pieces of 10×10 cm film, while the gloss will be referred to as determined by ISO 2813 and the clarity will be referred to as determined by ASTM D 1746-03 on a BYK Gardener Haze Guard Plus Device, calibrated with calibration cell 77.5, on at least 5 pieces of film 10×10 cm.

In the field of films, the above-mentioned mechanical and optical parameters should range in ranges meeting the requirements set by the packaging industry in the production, for example, of hygiene films and laminating films for food packaging, where transparency should be as high as possible.

PRIOR ART

Several polyethylene films are known whose properties essentially depend, in addition to on the nature of the composition on which the films are based, also on the way in which the film is prepared and, in particular, on the kind of process used to prepare the same. Among the different steps used to carry out the process, a key role is played by the catalyst system selected in the (co)polymerization step(s) which are carried out to obtain the polyethylene starting from ethylene and, optionally, one comonomer or more comonomers.

Accordingly, in the present description and in the following claims, the term "polymer" is used to indicate both a homopolymer, i.e. a polymer comprising repeating monomeric units derived from equal species of monomers, and a copolymer, i.e. a polymer comprising repeating monomeric units derived from at least two different species of monomers, in which case reference will be made to a binary copolymer, to a terpolymer, etc. depending on the number of different species of monomers used.

Among the prior art medium density polyethylene films, films prepared by means of chromium catalysts are known. Although substantially suitable for the purpose, the polyethylene films based on chromium catalysts suffer from an insufficient mechanical strength and a very poor transparency. By way of illustrative example, the known polyethylene films prepared by means of a chromium catalyst have a dart drop impact ranging from 150 to 200 g, a MFR (190/21.6) ranging from 10 to 15 g/10 min, a haze ranging from 70 to 80%, and a clarity ranging from 8 to 15%, such values being essentially a function of the film thickness.

Such values of mechanical strength and transparency are considered unacceptable, particularly in food packaging applications. In the attempt of improving the transparency, low density polyethylene (LDPE) prepared by high-pressure polymerization, which is known for being transparent, has been added to the medium density polyethylene prepared by means of chromium catalysts. In the present description and in the following claims, the term LDPE is used to indicate a polyethylene having a density from 0.910 to 0.930 $g/cm^3$.

For example, an LDPE film having a density of 0.930 $g/cm^3$ and a MFR (190/2.16) of 1 g/10 min may have a clarity of above 99% at a thickness of 50 μm.

Although the compositions made of MDPE and LDPE show an increased transparency, for example in terms of a certain increase of clarity up from an initial value of about 13% (MDPE alone) to a final value 56% (MDPE added with LDPE) at a thickness of 50 μm, a first disadvantage of these compositions is that such increase of transparency is still insufficient for film applications in food industry. A second disadvantage is that such a relative increase of transparency is obtained at the expenses of the mechanical strength. In particular, for example, MDPE films having a dart drop impact of 180 g, when added with LDPE, may have a dart drop impact in the range of 130-165 g depending on the amount of LDPE added to MDPE. Such worsening of the mechanical properties of the mixture is deemed to depend on the intrinsic poor mechanical dart drop impact of the LDPE.

Thus, no significant improvement in transparency has been attained by adding a LDPE to a MDPE prepared by means of a chromium catalyst and the relative improvement of the transparency inevitably results in an unacceptable worsening of the mechanical properties of the film.

It is also known to use a blend of a metallocene-catalyzed medium density polyethylene (mMDPE) with low density polyethylene (LDPE) and/or a linear low density polyethylene (LLDPE), to produce blown films, as for example described by U.S. Pat. No. 6,114,456. Compositions of such kind have sufficient processability and are used to make blown films which have to some extent the good optical properties of LDPE and the good mechanical properties of mMDPE. However, such compositions have the main disadvantage in that the dart drop impact sensibly decreases as the density increases.

Patent application WO 01/62847 discloses a bimodal extrusion composition of polyethylene which is prepared by (co)polymerizing ethylene in a multistage polymerization sequence of successive polymerization stages in the presence of a single site catalyst. According to WO 01/62847, the bimodal composition of polyethylene can be extruded with addition of small amounts, namely 10 wt-% or less, of high pressure LPDE by blending or by coextrusion. The addition of LDPE to such a bimodal composition, however, does not allow to obtain a film product having adequate optical properties.

A polyethylene film made from a composition of a high-density polyethylene (HDPE) and a low-density polyethylene (LDPE) prepared by high-pressure polymerization process is also known and has been hitherto used as a packaging material utilizing its transparency. However, the mechanical strength of the polyethylene film is yet insufficient. Therefore, there have been attempts to improve the impact resistance thereof. In order to improve the impact resistance, U.S. Pat. No. 6,426,384 for example teaches to prepare a polyethylene film for packaging starting from a polyethylene resin composition comprising a linear low-density polyethylene prepared using a metallocene-based catalyst and a high-density polyethylene prepared using a Ziegler type catalyst. However, the increase of the impact resistance is still insufficient.

EP-A1-1 470 185 describes a blend from about 20% by weight to about 80% by weight of a high-molecular weight, medium density polyethylene having a multimodal molecular weight distribution and about 20% by weight to about 80% by weight of a linear low density polyethylene. The medium density polyethylene is prepared by using Ziegler catalysts. The blend may optionally contain a third polymer, such as for example low density polyethylene, in an amount preferably less than 50% by weight of the total blend. However, the dart drop impact and the tear strength of the films prepared starting from such blend are inadequate.

SUMMARY OF THE INVENTION

In view of the above, the Applicant has perceived the need of providing a polyethylene composition, as well as a process for the preparation thereof and a film comprising such a polyethylene composition which, in sharp contrast to the prior art, although having a density which may range in the medium-high density range, has a high dart drop impact and a high transparency, while maintaining a good degree of processability so as to permit to use low working temperatures.

In other words, the technical problem underlying the present invention is that of providing a polyethylene composition having a suitable processability, while simultaneously achieving an improved balance between both mechanical and optical properties, in particular in terms of impact resistance and clarity. Such problem, as discussed above, is particularly felt in the medium-high density range film applications.

According to a first aspect of the present invention, the above-mentioned technical problem is solved by a polyethylene composition comprising:
a) from 50 to 89% by weight of a first polyethylene component comprising at least one multimodal ethylene polymer including a plurality of ethylene polymer fractions having distinct molecular weights and comonomer contents, at least one of said plurality of ethylene polymer fractions being prepared by the use of a single site catalyst; and
b) from 50 to 11% by weight of a second polyethylene component comprising a low or medium density polyethylene.

In the present description and in the following claims, the expression "single site catalyst" is used to indicate any transition metal coordination compound comprising at least one ligand, such as for example a compound selected in the group of cyclopentadienyl derivatives, phenoxyimin derivatives, as well as neutral or charged bidentate or tridentate nitrogen ligands with 2 or 3 coordinating nitrogen atoms.

In the present description and in the following claims, the expression "low or medium density polyethylene" is used to indicate any polyethylene having a density in the range 0.910 to 0.940 g/cm$^3$.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Thanks to the fact that the first polyethylene component includes a plurality of ethylene polymer fractions having distinct molecular weights, i.e. thanks to the fact that the first polyethylene composition is multimodal, the composition of the invention, on the one side, may have a broad molecular distribution, which advantageously permits to improve the processing of the composition. Furthermore, thanks to the fact that the multimodal first polyethylene component of the invention includes a plurality of ethylene polymer fractions having distinct comonomer contents, the composition of the invention, on the other side, may be tailored in such a way to preferentially include relatively greater amounts of comonomer within the relatively higher molecular weight fractions, and relatively smaller amounts of comonomer within the relatively lower molecular weight fractions, which advantageously permits to improve the mechanical properties of the composition, and in particular the puncture resistance as well as the tensile and tear strength of the film products prepared therefrom.

Furthermore, thanks to the presence of a second polyethylene component comprising a polyethylene having a density ranging in the low and medium density range, the composition of the invention has, in addition to the above-mentioned suitable processability and mechanical properties, also improved optical properties, in particular in terms of clarity and gloss.

Surprisingly, such improvement of the optical properties does not substantially affect the mechanical and processability properties of the composition of the invention. So, the present invention advantageously allows to obtain a balance between optical and mechanical properties, which are normally conflicting with each other.

If the second polyethylene component is present in an amount lower than 11%, the transparency of the polyethylene composition is inadequate, while if the second polyethylene component is present in an amount higher than 50%, an unacceptable worsening of the mechanical properties is observed.

Preferably, the polyethylene composition comprises from 55 to 85% by weight of said first polyethylene component and from 45 to 15% by weight of said second polyethylene component. More preferably, the polyethylene composition comprises from 60 to 85% by weight of said first polyethylene component and from 40 to 15% by weight of said second polyethylene component. Still more preferably, the polyethylene composition comprises from 60 to 80% by weight of said first polyethylene component and from 40 to 20% by weight of said second polyethylene component.

Within such preferred composition ranges, it is advantageously possible to prepare films having a further improved combination of optical and mechanical properties, while being at the same time easily processable.

In order to obtain films having a particularly advantageous combination of mechanical and optical properties, a preferred embodiment of the composition of the invention provides a polyethylene composition comprising from 70 to 80% by weight of said first polyethylene component and from 30 to 20% by weight of said second polyethylene component.

The first polyethylene component has preferably a density of from 0.920 to 0.970 g/cm$^3$, more preferably of from 0.920 to 0.960 g/cm$^3$, still more preferably of from 0.930 to 0.950 g/cm$^3$ and, in particular, of from 0.932 to 0.945 g/cm$^3$.

The above-mentioned advantageous effects of the invention in terms of improved processing, mechanical resistance and optical properties are particularly pronounced when the density of the multimodal first polyethylene component ranges in the medium-high density range, e.g. in the range from 0.932 to 0.945 g/cm$^3$.

Preferably, the polyethylene composition has a density of from 0.915 to 0.965 g/cm$^3$, more preferably from 0.915 to 0.960 g/cm$^3$, still more preferably from 0.915 to 0.955 g/cm$^3$, particularly preferably from 0.915 to 0.945 g/cm$^3$. According to further preferred embodiments of the invention, the polyethylene composition has preferably a density of from 0.920 to 0.955 g/cm$^3$, more preferably from 0.930 to 0.950 g/cm$^3$ and, still more preferably, from 0.935 to 0.940 g/cm$^3$. A further improvement of the optical properties without a substantial affection of the mechanical properties and an increase in the stiffness is advantageously achieved when the density falls in these preferred ranges. In other words, an improved balance between optical and mechanical properties is advantageously obtained.

Preferably, at least one fraction of the above-mentioned plurality of ethylene polymer fractions of the first polyethylene component comprises an ethylene copolymer containing a comonomer including at least one 1-olefin.

Preferably, the at least one 1-olefin has formula $R^1CH=CH_2$, wherein $R^1$ is hydrogen or an alkyl radical with 1 to 12 carbon atoms and, more preferably, wherein $R^1$ is an alkyl radical with 1 to 10 carbon atoms.

In the above-mentioned ethylene copolymer, in addition to ethylene it is possible to use any 1-olefin having from 3 to 12, preferably to 3 to 10, carbon atoms, e.g. propene, 1-butene, 1-pentene, 1-hexene, 4-methyl-1-pentene, 1-heptene, 1-octene and 1-decene. More particularly, the ethylene copolymer preferably comprises 1-olefins having from 4 to 8 carbon atoms, e.g. 1-butene, 1-pentene, 1-hexene, 4-methyl-pentene or 1-octene, in copolymerized form as comonomer unit. Particular preference is given to 1-olefins selected from the group consisting of 1-butene, 1-hexene and 1-octene.

The above-mentioned comonomers can be present either individually or in a mixture with one another.

According to a preferred embodiment of the polyethylene composition of the invention, the first polyethylene component comprises a multimodal polyethylene in which the lower molecular weight ethylene polymers are preferably homopolymers or, alternatively, copolymers containing less than 1% by weight of comonomer(s), more preferably less than 0.5%, while the higher molecular weight ethylene polymers are preferably copolymers containing a predetermined amount of comonomer(s) which is preferably greater than 1% by weight. Preferably, such predetermined amount of comonomer(s) of the copolymers either increases as a function of the molecular weight of the higher molecular weight ethylene polymers or remains equal, the amount of comonomer(s) of the highest molecular weight ethylene polymer being of 2-10% by weight based on the copolymer.

Preferably, the first polyethylene component comprises a bimodal polyethylene including a relatively low molecular weight ethylene polymer and a relatively high molecular weight ethylene polymer. Preferably, the bimodal polyethylene has a density comprised in the range from 0.932 to 0.945 g/cm$^3$, more preferably from 0.930-0.940 g/cm$^3$.

Preferably, the relatively low molecular weight component and the relatively high molecular weight component of the bimodal first polyethylene composition have an intrinsic viscosity in decalin at 135° C. of from 0.6 to 1.2 dl/g and, respectively, of from 2.5 to 5 dl/g as determined according to EN ISO 1628-3:2003.

In this way, the balance between optical and mechanical properties of the polyethylene composition of the invention is further improved.

More preferably, the composition of the invention comprises, as a first polyethylene component, a bimodal polyethylene component including a relatively low molecular weight component having a MFR (190/21.6) of from above 5 to 100 g/10 min and a relatively high molecular weight component having a MFR (190/21.6) of from 5 to 15 g/10 min, and in any case lower than the MFR (190/21.6) of the relatively low molecular weight component.

According to a preferred embodiment of the polyethylene composition of the invention, the first polyethylene component comprises a bimodal polyethylene, in which said relatively low molecular weight ethylene polymer is preferably a homopolymer or, alternatively, a copolymer containing less than 1% by weight of comonomer, more preferably less than 0.5%, while said relatively high molecular weight ethylene polymer is preferably a copolymer containing a predetermined amount of comonomer preferably higher than 1%, for example comprised between 1% and 10% by weight, preferably from 2 to 8%, more preferably from 2.5 to 5% and, still more preferably, from 3 to 4% by weight.

In this way, and in particular thanks to the absence of comonomer or, at the most, thanks to a limited content of comonomer in the relatively low molecular weight fraction of the first polyethylene, content which, as said above, is preferably not higher than 1% and more preferably not higher than 0.5%, the composition of the invention is particularly easily processable, which advantageously allows to use lower working temperatures, for example in the range of 180-250° C.

Preferably, the relatively high molecular weight ethylene copolymer comprises from 1% to 10% by weight, preferably from 2 to 8%, more preferably from 2.5 to 5% and, still more preferably, from 3 to 4% by weight of a comonomer, which preferably includes at least one of the comonomers described above, in particular a comonomer selected from the group of propene, 1-butene, 1-pentene, 1-hexene, 4-methyl-1-pentene, 1-heptene, 1-octene and 1-decene.

According to a preferred embodiment of the invention, at least the ethylene polymer fraction of the multimodal (e.g. bimodal) polyethylene of the first polyethylene component having the lowest molecular weight is prepared by means of the above-mentioned single site catalyst.

Preferably, the above-mentioned single site catalyst used to prepare the at least one ethylene polymer fraction of the multimodal polyethylene of the first polyethylene component is a metallocene.

So, for example, in the preferred embodiment according to which the first polyethylene component comprises a bimodal polyethylene including two ethylene polymer fractions having distinct molecular weights and comonomer contents, namely a relatively high molecular weight ethylene polymer fraction preferably including copolymers containing a predetermined amount of comonomer preferably greater than 1% by weight, and a relatively low molecular weight ethylene polymer fraction preferably including homopolymers or copolymers containing less than 1% by weight of comonomer, more preferably less than 0.5%, the relatively high molecular weight ethylene polymer fraction is preferably obtained by means of the above-mentioned single site catalyst, for example by means of a metallocene.

According to a preferred embodiment of the invention, a mixed type catalyst may be used, i.e. a catalyst comprising particles each containing a plurality of different kind of active species, in which at least one active specie is a single site catalyst.

Thanks to the fact that in the case of a mixed type catalyst containing at least two active species at least two different polymerization catalysts are provided within the same catalyst system, on the one side the first polyethylene compound is multimodal and, on the other side, it is advantageously possible to prepare the first polyethylene component by means of a polymerization process carried out in a single reactor.

When the mixed type catalyst contains only two active species, for example, a bimodal first polyethylene component of the composition may be advantageously obtained, which permits, on the one side, to prepare a broad molecular weight distribution composition and, on the other side, to polymerize both the relatively low molecular weight component and the relatively high molecular weight component in a parallel way, i.e. substantially in a simultaneous manner, in one single reactor.

By way of illustrative example, the mixed catalyst may contain at least one metallocene (by way of illustrative and not limiting example, a hafnocene or a zirconocene) component and one iron component. In particular, the mixed catalyst may contain one metallocene (e.g. hafnocene or zirconocene) component and one iron component.

However, any other combination of active species which are able to polymerize ethylene in such a manner as to obtain a relatively high molecular weight component containing preferably at least 1% of comonomer and, respectively, a relatively low molecular weight component containing an amount of comonomer preferably lower than 1%, is acceptable for the purpose of the invention.

Preferably, in the preferred embodiment in which the catalyst contains one metallocene, for example a hafnocene or a zirconocene, component and one iron component, the iron component has preferably a tridentate ligand bearing at least two aryl radicals, each bearing a halogen or alkyl substituent in the ortho-position(s) as described by formula (B) disclosed in WO2005/103095 in the name of the Applicant, which is hereby incorporated by reference.

The mixed catalyst may for example comprise, as active species, at least one first component and at least one second component, as well as at least one activating compound so as to advantageously improve the polymerization activity of the first and second component. The activation of the at least one first component and of the at least second component of the catalyst may be effected using the same activating compound or different activating compounds. The molar ratio of the first component to the activating compound, as well as the molar ratio of the second component to the activating compound, may range in a first and, respectively, in a second predetermined range which, with reference to the illustrative example of the catalyst comprising one metallocene component and one iron component, is preferably as follows. The molar ratio of the metallocene component to the activating compound may range from 1:0.1 to 1:10000, preferably from 1:1 to 1:2000. The molar ratio of the iron component to the activating compound is also usually in the range from 1:0.1 to 1:10000, preferably from 1:1 to 1:2000.

Suitable activating compounds which are able to react with one of the components of the mixed catalyst, for example with the hafnocene component or the iron component, to convert the same into a catalytically active or more active compound are, for example, compounds such as an aluminoxane, a strong uncharged Lewis acid, an ionic compound having a Lewis-acid cation or an ionic compound containing a Brönsted acid as cation.

The catalyst may further comprise at least one support. The preferred catalyst composition according to the invention comprises one support or a plurality of supports, which may be organic or inorganic. The first component and/or the second component and the optional activating compound of the catalyst, in particular, may be supported, for example on different supports or together on a common support.

Preferably a finely divided organic or inorganic solid support, such as for example silica, hydrotalcite, magnesium chloride, talc, montmorillonite, mica, or an inorganic oxide or a finely divided polymer powder (e.g. polyolefin or a polymer having polar functional groups) is used.

The catalyst system may further comprise a metal compound, preferably a metal of group 1, 2 or 13 of the Periodic Table and preferably different from the above-mentioned activating component, which is used as constituent of the catalyst for the polymerization or copolymerization of olefins, for example to prepare a catalyst solid comprising the support and/or be added during or shortly before the polymerization.

It is also possible for the catalyst system firstly to be prepolymerized with a α-olefin, preferably with a linear $C_2$-$C_{10}$-1-alkene and in particular ethylene or propylene. The resulting prepolymerized catalyst solid may then be submitted to the actual polymerization step.

Furthermore, a small amount of an olefin, preferably an α-olefin, for example vinylcyclohexane, styrene or phenyldimethylvinylsilane can be added as additive during or after the preparation of the catalyst. Other additives, such as for example wax or oil, can be also added during or after the preparation of the catalyst.

Preferably, the first polyethylene component of the polyethylene composition has a molar mass distribution width $M_w/M_n$ of from 5 to 30. Preferably, the first polyethylene component has a weight average molar mass $M_w$ of from 50 000 g/mol to 500 000 g/mol. Preferably, the first polyethylene component has a z-average molecular weight $M_z$ of less than 1 Mio. g/mol.

Preferably, the first polyethylene component of the polyethylene composition has a molar mass distribution width $M_w/M_n$ in the range from 6 to 20 and, more preferably, from 7 to 15.

Preferably, the weight average molar mass $M_w$ of the first polyethylene component of the polyethylene composition is in the range from 100 000 g/mol to 300 000 g/mol and, more preferably, from 120 000 g/mol to 250 000 g/mol.

The z-average molar mass $M_z$ of the first polyethylene component of the polyethylene composition is preferably in the range of from 250 000 g/mol to 700 000 g/mol and, more preferably, from 300 000 g/mol to 500 000 g/mol. The definition of z-average molar mass $M_z$ is used herewith in accordance with the definition given in *High Polymers* Vol. XX, Raff and Doak, Interscience Publishers, John Wiley & Sons, 1965, page 443.

According to a particularly preferred embodiment of the present invention, the first polyethylene component has the following preferred features:

a molar mass distribution width $M_w/M_n$ of from 5 to 30;
a weight average molar mass $M_w$ of from 50000 g/mol to 500 000 g/mol; and
a z-average molecular weight $M_z$ of less than 1 Mio. g/mol.

Such a preferred combination of features advantageously permits to provide a polyethylene composition in which the first polyethylene component has improved and balanced processability and mechanical properties, which in turn advantageously permits to add sensibly great amounts of the second polyethylene component, for example in the range of 35-50% by weight, with advantageous increase of the transparency without substantially altering the processing and mechanical properties.

The first polyethylene component of the polyethylene composition has a MFR (190/21.6) which is preferably in the range of from 5 to 100 g/10 min, more preferably in the range of from 7 to 60 g/10 min and, still more preferably, of from 9 to 50 g/10 min.

In the present description and in the following claims, the MFR (190/21.6) is the melt flow rate measured in accordance with ISO 1133, condition G, namely at 190° C. and under a load of 21.6 kg.

The first polyethylene component preferably comprises a fraction having a molar mass of below 1 Mio. g/mol as determined by Gel Permeation Chromatography (GPC) in the standard determination of the molecular weight distribution according to standard DIN 55672 with 1,2,4-trichlorobenzene at 140° C. More preferably, said fraction amounts to at least 95.5% by weight of the first polyethylene component.

The first polyethylene component has preferably a Eta (vis)/Eta(GPC) lower than 0.95, Eta(vis) being the intrinsic viscosity as determined according to ISO 1628-1 and -3 and Eta(GPC) being the viscosity as determined by GPC according to DIN 55672, with 1,2,4-Trichlorobenzene, at 140° C.

According to a preferred embodiment of the composition of the invention, the second polyethylene component has a density of from 0.910 to 0.940 g/cm³, preferably of from 0.910 to 0.933 g/cm³, more preferably of from 0.915 to 0.933 g/cm³ and, still more preferably, of from 0.925 to 0.930 g/cm³.

Preferably, the second polyethylene component has a density lower than the density of the first polyethylene component.

The second polyethylene component of the composition of the invention has preferably a MFR (190/2.16) of from 0.2 to 50 g/10 min, more preferably from 0.3 to 10 g/10 min, and, still more preferably, from 0.3 to 5 g/10 min.

According to a second aspect thereof, the present invention relates to a process for producing a polyethylene composition, comprising the steps of:

a) preparing a multimodal first polyethylene component by:
a1) providing at least one single site catalyst;
a2) subjecting ethylene, optionally with at least one comonomer, in the presence of said at least one single site catalyst, to a plurality of polymerization stages intended to obtain a respective plurality of ethylene polymer fractions;
a3) distinguishing said plurality of ethylene polymer fractions with respect to each other on the basis of molecular weights and comonomer contents;

b) preparing a second polyethylene component comprising a low or medium density polyethylene;

c) adding said second polyethylene component to said multimodal first polyethylene component so prepared so as to obtain a composition comprising from 50 to 89% by weight of the first polyethylene component and from 50 to 11% by weight of the second polyethylene component.

Thanks to the fact that the first polyethylene component is of the multimodal type and that the second polyethylene component comprises a low density polyethylene or a medium density polyethylene, it is advantageously possible to obtain a polyethylene composition which is easily processable and has improved optical properties. The addition—in the above-mentioned predetermined amount—of a second polyethylene component including a LDPE or a MDPE to a multimodal first polyethylene component defined as above, advantageously allows to prepare a polyethylene composition having simultaneously an improvement of the optical properties, in particular in terms of haze, clarity and gloss, without substantially compromising the mechanical properties, in particular in terms of dart drop impact, as well as the processability of the composition. An improved balance among conflicting properties is therefore achieved, and this improvement is particularly pronounced when the density of the multimodal first polyethylene component ranges in the medium-high density range.

The step of providing at least one single site catalyst is preferably carried out in such a manner to obtain a catalyst according to any one of the preferred embodiments described above with reference to the composition of the invention. So, for example, if the catalyst is a mixed type catalyst, it is advantageously possible to prepare the multimodal first polyethylene component by means of a polymerization process carried out in a single reactor.

Said step of preparing the multimodal first polyethylene component is carried out in such a manner as to obtain a first polyethylene component having a density of from 0.920 to 0.955 g/cm³, more preferably from 0.930 to 0.950 g/cm³ and, still more preferably, from 0.932 to 0.945 g/cm³.

Ethylene with at least one comonomer, and optionally preferably with hydrogen as preferred molar mass regulator, is subjected, in the presence of said at least one single site catalyst, to a plurality of polymerization stages, preferably to a two polymerization stages so as to conveniently obtain a relatively low molecular weight component and a relatively high molecular weight component.

Preferably, the process is carried out so as to obtain a relatively low molecular weight component and a relatively high molecular weight component having an intrinsic viscosity in decalin at 135° C. of from 0.6 to 1.2 dl/g and, respectively, of from 2.5 to 5 dl/g as determined according to EN ISO 1628-3:2003.

In this way, the processability of the composition is further improved.

Preferably, the process is carried out so as to obtain a bimodal first polyethylene component comprising a relatively low molecular weight component having a MFR (190/21.6) of from above 5 to 100 g/10 min and a relatively high molecular weight component having a MFR (190/21.6) of from 5 to 15 g/10 min, and in any case lower than the MFR (190/21.6) of the relatively low molecular weight component According to a preferred embodiment of the process of the invention, the ethylene may be copolymerized with at least one 1-olefin, such as for example one or more of the 1-olefins described above with reference to the preferred embodiments of the composition of the invention. So, for example, the ethylene is preferably subjected to copolymerization with at least one 1-olefin having formula $R^1CH=CH_2$, wherein $R^1$ is hydrogen or an alkyl radical with 1 to 12 carbon atoms and, more preferably, with 1 to 10 carbon atoms. As a comonomer, any 1-olefin having from 3 to 12 carbon atoms, e.g. propene, 1-butene, 1-pentene, 1-hexene, 4-methyl-1-pentene, 1-heptene, 1-octene and 1-decene may be used. The comonomer preferably comprises 1-olefins having from 4 to 8 carbon atoms, e.g. 1-butene, 1-pentene, 1-hexene, 4-methylpentene or 1-octene, in copolymerized form as comonomer unit. Particular preference is given to 1-olefins selected from the group consisting of 1-butene, 1-hexene and 1-octene.

The above-mentioned comonomers can be present either individually or in a mixture with one another.

Preferably, the temperature at which ethylene is (co)polymerized is carried out is of from 20 to 200° C. Preferably, the pressure at which ethylene is (co)polymerized is carried out is from 0.05 to 1 MPa.

The step of preparing the multimodal first polyethylene is preferably carried out in such a way as to obtain a first polyethylene component having:
 a molar mass distribution width $M_w/M_n$ of from 5 to 30;
 a weight average molar mass $M_w$ of from 50000 g/mol to 500 000 g/mol; and
 a z-average molecular weight $M_z$ of less than 1 Mio. g/mol.

Preferably, the step of distinguishing the plurality of ethylene polymer fractions with respect to each other on the basis of molecular weights is carried out by using at least two active catalytic species.

More preferably, such at least two active catalytic species, of which at least one is of the single site type, are incorporated in the same catalyst particle. In such a preferred embodiment, a corresponding plurality of polymerization stages is advantageously carried out in a substantially simultaneous manner in a parallel mode and the result of such plurality of substantially simultaneous polymerization stages is a multimodal polyethylene composition. Thanks to these preferred features, it is advantageously possible to prepare the first polyethylene component by means of a single step polymerization process in a single reactor, thus advantageously reducing both the plant costs and the energy consumption with respect to the processes carried out in a plurality of reactors.

Alternatively, the above-mentioned at least two active catalytic species are incorporated in different catalyst particles. Also in this case, by providing a mixture of at least two particulate catalysts, a corresponding plurality of polymerization stages is advantageously carried out in a substantially simultaneous manner in a parallel mode and the result of the different substantially simultaneous polymerization stages is a multimodal polyethylene composition.

The step of distinguishing the plurality of ethylene polymer fractions with respect to each other on the basis of molecular weights may be also carried out by polymerizing ethylene in a respective plurality of reactors arranged in series with each other. In this case, a corresponding plurality of polymerization stages is advantageously carried out in a serial mode, and the result of the different subsequent polymerization stages is a multimodal polyethylene composition. Thanks to these preferred steps, it is advantageously possible to prepare the first polyethylene component by means of a multistage polymerization process in which the polymerization stages are subsequent to each other.

Independently of the number of reactors used, with each of these three alternative methods, good mixing of the polyethylene is advantageously achieved and the control of the molecular weight fractions of the various polymers and of the molecular weight distributions is conveniently simple.

A further possible alternative in order to distinguish the plurality of ethylene polymer fractions with respect to each other on the basis of molecular weights is that of blending a plurality of polymer fractions each obtained by the use of a respective catalyst. In this case, by blending such a plurality of polymer fractions, it is advantageously possible to obtain a multimodal polyethylene composition in a parallel mode, as a result of the blending of polymer fractions which have been separately prepared, either simultaneously or subsequently to each other, by the use of respective catalyst in respective polymerization stages.

The above-mentioned addition step is preferably carried out so as to obtain a composition comprising from 50 to 89% by weight of said first polyethylene component and from 50 to 11% by weight of said second polyethylene component, more preferably from 55 to 85% by weight of said first polyethylene component and from 45 to 15% by weight of said second polyethylene component, still more preferably the polyethylene composition comprises from 60 to 85% by weight of said first polyethylene component and from 40 to 15% by weight of said second polyethylene component and, in particular.

Within such preferred composition ranges, it is advantageously possible to prepare films having a further improved transparency.

In order to obtain films having a particularly advantageous combination of mechanical and optical properties, a preferred embodiment of the process of the invention provides an additional step which is carried out so as to prepare a polyethylene composition comprising from 65 to 80% by weight of said first polyethylene component and from 35 to 20% by weight of said second polyethylene component and, more preferably, from 70 to 80% by weight of said first polyethylene component and from 30 to 20% by weight of said second polyethylene component According to a preferred embodiment of the process of the invention, the above-mentioned step of adding the second polyethylene component to the first polyethylene component is carried out by blending.

In this way, a good mixing of the first polyethylene component and of the second polyethylene component is advantageously achieved.

Alternatively, the step of adding the second polyethylene component to the first polyethylene component is carried out by compounding or by coextrusion.

The polymerization of ethylene in order to prepare the first polyethylene component can be carried out using all industrially known polymerization methods at temperatures in the range from 60° C. to 350° C., preferably from 0 to 200° C. and particularly preferably from 25 to 150° C., and under pressures of from 0.5 to 4000 bar, preferably from 1 to 100 bar, and particularly preferably from 3 to 40 bar. The polymerizations effected to prepare the first polyethylene component can be carried out in a known manner in bulk, in suspension, in the gas phase or in a supercritical medium in the conventional reactors used for the polymerization of olefins. It can be carried out batchwise or, more preferably, continuously in one stage (for example, as described above, if a mixed catalyst is used) or in more stages. Solution processes, suspension processes, stirred gas-phase processes and gas-phase fluidized-bed processes are all possible. The second polyethylene component is preferably prepared by conventional high-pressure polymerization processes in tube reactors or autoclaves.

The mean residence times are preferably from 0.5 to 5 hours. The advantageous pressure and temperature ranges for carrying out the polymerizations usually depend on the polymerization method.

In the case of suspension polymerizations, for example, the polymerization is usually carried out in a suspension medium, preferably an inert hydrocarbon such as isobutane or mixtures of hydrocarbons or else in the monomers themselves. The polymerization temperatures are generally in the range from −20° C. to 115° C., and the pressure is generally in the range from 1 to 100 bar. The solids content of the suspension is generally in the range from 10% to 80%. The polymerization can be carried out either batchwise or continuously, e.g. in stirring autoclaves, in tube reactors, such as for example in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

In the case of high-pressure polymerization processes, which are conventionally carried out at pressures of from 1000 to 4000 bar, in particular from 2000 to 3500 bar, high polymerization temperatures are generally also set. Advantageous temperature ranges for these high-pressure polymerization processes are from 200° C. to 320° C., in particular from 220° C. to 290° C. In the case of low-pressure polymerization processes, it is usual to set a temperature which is at least a few degrees below the softening temperature of the polymer. In particular, temperatures of from 140° C. to 310° C. are preferably set in these polymerization processes.

Among the above-mentioned polymerization processes used to prepare the first polyethylene component, particular preference is given to gas-phase polymerization and, more in particular, in gas-phase fluidized-bed reactors, solution polymerization and suspension polymerization, such as for example in loop reactors and stirred tank reactors. The gas-phase polymerization may also be carried out in the condensed or supercondensed mode, in which part of the circulating gas is cooled to below the dew point and is recirculated as a two-phase mixture to the reactor. Furthermore, it is possible to use a multizone reactor in which at least two reciprocally linked polymerization zones are provided, so that the polymer is passed alternately through these at least two zones a predetermined number of times. The at least two zones may also be subjected to different polymerization conditions. Such a multizone reactor is described, for example, in WO 97/04015. The different or identical polymerization stages, as already explained above, may also, if desired, be carried out in a serial manner, namely in a plurality of reactors arranged in series to each other so as to form a polymerization cascade. A parallel reactor arrangement using two or more identical or different processes is also possible. Furthermore, molar mass regulators, such as for example hydrogen, or conventional additives, such as for example antistatics, may also be used in the polymerizations. If hydrogen is added and if the temperature is increased, a lower z-average molar mass is advantageously achieved.

The polymerization is preferably carried out in a single reactor, in particular in a gas-phase reactor. The polyethylene powder so obtained is advantageously more homogeneous with respect to the polyethylene obtained as a result of a cascade process, where a number of polymerization stages are carried out in a serial manner in a plurality of reactors arranged in series to each other, so that, unlike the powder obtainable by means of the cascade process, a possible subsequent extrusion is conveniently not necessary in order to obtain a homogeneous product.

The composition of the invention may also be prepared by blending a first polyethylene component and a second polyethylene component as defined above, preferable by intimate mixing of individual components, for example by melt extrusion in an extruder or kneader (as described, for example, in "Polymer Blends" in *Ullmann's Encyclopedia of Industrial Chemistry*, 6$^{th}$ Edition, 1998, Electronic Release).

According to a further aspect thereof, the present invention relates to the use of a polyethylene composition as defined above for producing a film.

Furthermore, the present invention relates to a film comprising a polyethylene composition as defined above, as well as to a particularly preferred film selected from the group of stretch films, hygienic films, films for office uses, sealing layers, automatic packaging films, composite and laminating films.

Films in which the polyethylene of the invention is present as a significant component are ones which contain from 50 to 100% by weight, preferably from 60 to 90% by weight, of the polyethylene of the invention, based on the total polymer material used for manufacture. In particular, films including a plurality of layers in which in which at least one of the layers contains from 50 to 100% by weight of the polyethylene of the invention are also included.

In general the films are preferably produced by plastification of the polyethylene composition of the invention at a melt temperature in the range of from 190 to 230° C., by forcing the plasticized polyethylene through an annular die and cooling. The film may further comprise of from 0 to 30% by weight, preferably 0.1 to 3 by weight of auxiliaries and/or additives known per se, e.g. processing stabilizers, stabilizers against the effects of light and heat, customary additives such as lubricants, antioxidants, antiblocking agents and antistatics, and also, if appropriate, dyes.

The polyethylene composition of the invention may be used to prepare films with a thickness of from 5 µm to 2.5 mm. The films can for example be prepared via blown film extrusion with a thickness of from 5 µm to 250 µm or via flat film extrusion, such as cast film extrusion with a thickness of from 10 µm to 2.5 mm. During blown film extrusion the polyethylene melt is forced through an annular die. The bubble which is formed is inflated with air and hauled off at a higher speed than the die outlet speed. The bubble is intensively cooled by a current of air so that the temperature at the frost line is lower than the crystallite melting point. The bubble is then collapsed, trimmed if necessary and rolled up using a suitable winding instrument. The polyethylene composition of the invention may be extruded either according to two alternative configurations known in the art, namely according to a "long stalk" configuration or according to a "conventional" configuration depending on the density of the polyethylene. In the "long stalk" configuration, which is normally suitable for blowing high density polyethylene, the bubble of polymer blown into a film has a well defined and longer neck height with respect to the "conventional" configuration, which is suitable in blowing low density polyethylene.

The films may be obtained for example in chill roll lines or thermoforming film lines. Furthermore composite films essentially based one the polyethylene composition of the invention may be produced on coating and laminating lines. Especially preferred are composite films wherein paper, aluminum or fabric substrates are incorporated into the composite structure. The films may have a single layer or a plurality of layers, each obtained by coextrusion.

The polyethylene composition of the invention is suitable for producing films in blown film and cast film plants at high outputs. The films display improved mechanical properties, in particular, as better described in the following, high tensile strength and tear strength together with improved optical properties, in particular transparency and gloss. The composition of the invention is suitable, in particular, for preparing packaging films, such as for example heat sealing films, also for heavy duty sacks and in particular for films intended to be used in the food industry.

The films of the invention are especially suitable in applications requiring high clarity and gloss such as carrier bags to permit high quality printing, laminating films in foodstuff applications, since the films of the invention also have a very low odor and taste level and automatic packaging films, since the film can be processed on high-speed lines.

The films of the invention having a thickness in the order of 50 µm have advantageously a haze, as determined by ASTM D 1003-00 on a BYK Gardener Haze Guard Plus Device on at least 5 pieces of film of size 10×10 cm, below 22%. The dart drop impact of films having a thickness in the order of 50 µm as determined by ASTM D 1709 Method A is advantageously above 140 g. The clarity of films having a thickness in the order of 50 µm as determined by ASTM D 1746-03 on a BYK Gardener Haze Guard Plus Device, calibrated with calibration cell 77.5, on at least 5 pieces of 10×10 cm films is advantageously at least 86%. The 20° gloss of films having a thickness in the order of 50 µm as determined by ASTM D 2457-03 on a 20° gloss meter with a vacuum plate for fixing the film, on at least 5 pieces of film, is advantageously of at least 15.

The scrap obtained during the production of these films can be conveniently recycled. If the films are produced by a first extruder, film trimmings may be compacted or ground and fed to a second extruder, where they are melted so as to be ready to be fed back to the main extruder and, in this way, conveniently recycled. The film trimmings should be reground to grains having a size which can be fed into the feed section of the first extruder together with the virgin polyethylene. The films containing such recycled material do not show any significant deterioration of the properties compared to films without recycled material.

The polyethylene composition of the invention may be also used to prepare articles by means of a number of techniques, such as for example blow molding, injection molding, roto-molding and compression molding.

DETAILED DESCRIPTION OF THE PREFERRED EMBODIMENTS

The present invention will be further described by means of the following preferred embodiments without restricting the scope of the invention.

Example 1 (Invention)

a) Preparation of the Individual Components 0.90 kg of 2,6-diacetylpyridine (99%), 2.56 kg of phosphorus pentoxide ($P_2O_5$), and a solution of 2.14 kg of 2,4-dichloro-6-methylaniline (100%) were solubilized in 20 l of tetrahydrofuran. The mixture was stirred for 15 min and then heated under reflux for 18 hours at 70° C. After completion of the reaction, the obtained suspension was cooled to 20° C., stirred for 30 min and then filtered and washed with 6 l of tetrahydrofuran. The filtrate, having a volume of 26 l, was concentrated under vacuum (250 mm Hg, 55° C.). The volume was reduced by rotary evaporation up to a final concentrate of 3.5 l. 20 l of methanol were added so as to obtain crystallization. The resulting suspension (23.5 l) was filtered and washed with 6 l of methanol, thus resulting in a volume of 27 l. The humid product (1.38 kg) resulting from the filtration was set under drying condition in free air for one night. This gave a first fraction of 1.36 kg of 2,6-Bis[1-(2,4,6-trimethylphenylimino)ethyl]pyridine in 51% yield. The filtrate (27 l) was concentrated as described above up to a final concentrate of 2.5 kg. 4 l of methanol were added. The resulting suspension was agitated for 1 hour at room temperature and washed with 0.4 l of methanol. A second fraction of 50 g was in this way obtained. Thus, a total of 1400 g of 2,6-Bis[1-(2,4,6-trimethylphenylimino)ethyl]pyridine in 53% yield were obtained. A reaction with iron(II) dichloride was carried out as described by Qian et al., *Organometallics* 2003, 22, 4312-4321.

b) Support Pretreatment 140 kg Sylopol 2107, a spray-dried silica gel from Grace, was calcinated at 600° C. for 6 hours.

c) Preparation of the Mixed Catalyst System

A mixture of 509 g (0.84 mol) of 2,6-Bis[1-(2,4-dichloro-6-methylphenylimino)ethyl]pyridine iron(II) dichloride, prepared according to the above-mentioned procedure under a), 4131 g (8.4 mol) of bis(n-butylcyclopentadienyl)hafnium dichloride, commercially available from Crompton, and 195 l of MAO (4.75 M in toluene, 926 mol) was stirred at 20° C. for 2 h and after cooling to 0° C. subsequently added while stirring to 140 kg of the pretreated support material b). The solution was added with a flow rate lower than 100 kg/h. The obtained product was stirred for further 30 minutes and heated to 40° C. The solid was dried under reduced pressure until it was free-flowing. After sieving, 320 kg of catalyst were obtained (residual solvent: 41%).

d) Polymerization

The polymerization was carried out in a fluidized-bed reactor having a diameter of 3.7 m in the presence of the mixed catalyst described above. The reaction temperature was 105° C., the pressure in the reactor was 25 bar, the reaction gas had the following composition: 49 vol % ethylene, 5.1 vol % hexane, 0.6 vol % hexene, 45 vol % nitrogen, 1.5 kg/h trihexylaluminum (2 wt % in hexane). The output was 5.5 t/h.

The MDPE polyethylene so obtained had a density of 0.939 g/cm$^3$ and a MFR (190/21.6) of 28 g/10 min. The MDPE, conveniently added with 700 ppm of a conventional processing additive, namely Polybatch® AMF 705 (available from A. Schulman) was used as a first polyethylene component, whose main properties are shown in Table 1 below, while Lupolen 3220 F, which is a LDPE commercially available from Basell Polyolefine GmbH having a density of 0.930 g/cm$^3$, and a MFR (190/2.16) of 0.9 g/10 min, was used as a second polyethylene component in an amount of 11% by weight.

Examples 2-4 (Invention)

In Examples 2-4 a first and a second polyethylene components as those described in Example 1 were used, except for the amount of LDPE, which was set to 20%, 30% and, respectively, 40% by weight.

TABLE 1

| | First PE component of Examples 1-4 |
|---|---|
| Density [g/cm$^3$] | 0.939 |
| MFR (190/21.6) [g/10 min] | 28 |
| Eta(vis)/Eta(GPC) | 2.08 |
| $M_w$ [g/mol] | 140000 |
| $M_w/M_n$ | 14.4 |
| $M_z$ | 462000 |
| GPC % at molar mass 1Mio | 99.3 |
| —HC=CH$_2$ [1/1000 C.] | 1.51 |
| total-CH$_3$ [1/1000 C.] | 8.0 |

Where
density is the polymer density
MFR (190/21.6) is the melt flow rate according to standard ISO 1133, condition G Eta(vis) is the intrinsic viscosity as determined according to ISO 1628-1 and Eta(GPC) is the viscosity as determined by GPC according to DIN 55672, with 1,2,4-Trichlorobenzene, at 140° C.

$M_w$ is the weight average molar mass;

$M_n$ is the number average molar mass $M_z$ is the z-average molar mass

GPC % at molar mass 1 Mio is the % by weight according to gel permeation chromatography below a molar mass of 1 Mio g/mol.

—HC=$CH_2$ is the amount of vinyl groups total-$CH_3$ is the amount of $CH_3$-groups per 1000 C including end groups.

Example 5-8 (Comparative)

Innovex LL6910AA, which is a conventional LLDPE prepared by the use of a Ziegler-Natta catalyst commercially available from BP (density equal to 0.936 g/cm$^3$, MFR (190/2.16) of 1.0 g/10 min), conveniently added with 700 ppm Polybatch® AMF 705, was used as a first polyethylene component, whose properties are shown in Table 2, while Lupolen 3220 F was used as a second polyethylene component in an amount of 11%, 20%, 30% and, respectively, 40% by weight.

TABLE 2

| | First PE component of Examples 5-8 |
|---|---|
| Density [g/cm$^3$] | 0.936 |
| MFR (190/2.16) [g/10 min] | 1.0 |

Where

MFR (190/2.16) is the melt flow rate according to standard ISO 1133, condition D.

Examples 9-12 (Comparative)

Lupolen 3721 C, which is a MDPE prepared by the use of a chromium catalyst commercially available from Basell (density equal to 0.937 g/cm$^3$, MFR (190/21.6) of 12.5 g/10 min), was used as a first polyethylene component, whose properties are shown in Table 3, while Lupolen 3220 F was used as a second polyethylene component.

TABLE 3

| | First PE component of Examples 9-12 |
|---|---|
| Density [g/cm$^3$] | 0.937 |
| MFR (190/21.6) [g/10 min] | 12.5 |
| Eta(vis)/Eta(GPC) | 2.80 |
| $M_w$ [g/mol] | 240000 |
| $M_w/M_n$ | 12.1 |
| $M_z$ | 1650000 |
| GPC % at molar mass 1Mio | 95.8 |
| —HC=$CH_2$ [1/1000 C.] | 0.72 |
| total-$CH_3$ [1/1000 C.] | 5.4 |

Granulation and Film Extrusion

The polyethylene compositions of Example 1-12 were homogenized and granulated on a ZSK 30 (Werner Pfleiderer) with screw combination 8A. The processing temperature was 220° C., the screw speed 250/min, the output of 20 kg/h.

Each polyethylene composition of the Examples above was extruded into films by blown film extrusion on a Weber film extruder equipped with a collapsing device with wooden flatted boards.

The diameter of the ring die was 50 mm, the gap width was 2/50 and the angle along which the cooling air is blown onto the extruded film was 45°. No filters were used. The 25D Extruder with a screw diameter of 30 mm and a screw speed of 50 turns per min gave an output of 5.1 kg/h. The blow-up ratio was 1:2 and the haul-off speed 4.9 m/10 min. The height of the frost line was 160 mm. Films with a thickness in the order of 50 μm were obtained. The specific thickness of each film, as well as the processing properties and optical and mechanical properties of the different films, are summarized in Tables 4 and 5.

TABLE 4 processing and optical properties of the films

| Example | Thickness [μm] | Gloss 20° | Gloss 60° | Haze [%] | Clarity [%] |
|---|---|---|---|---|---|
| 1 | 51 | 14 | 63 | 22 | 86 |
| 2 | 50 | 33 | 83 | 16 | 92 |
| 3 | 51 | 54 | 99 | 14 | 97 |
| 4 | 51 | 66 | 104 | 12 | 98 |
| 5 | 50 | 63 | 97 | 14 | 99 |
| 6 | 51 | 77 | 106 | 13 | 99 |
| 7 | 51 | 75 | 105 | 12 | 98. |
| 8 | 52 | 71 | 102 | 11 | 99 |
| 9 | 51 | 1.5 | 16 | 61 | 23 |
| 10 | 51 | 2.2 | 22 | 45 | 33 |
| 11 | 51 | 3.2 | 29 | 34 | 47 |
| 12 | 50 | 4.2 | 35 | 30 | 56 |

TABLE 5 mechanical properties of the films

| Example | Dart Drop [g] | Dynamic Test [Nm/mm] $W_s$ | Dynamic Test [Nm/mm] $W_{tot}$ | Tensile strength [N/mm$^2$] MD | Tensile strength [N/mm$^2$] TD | Tear propagation (Elmendorf method) [mN] MD | Tear propagation (Elmendorf method) [mN] TD |
|---|---|---|---|---|---|---|---|
| 1 | 276 | 11.6 | 13.1 | 42.2 | 35.1 | 2323 | 6058 |
| 2 | 241 | 11.1 | 12.5 | 41.8 | 34.5 | 2323 | 14848 |
| 3 | 235 | 9.8 | 12.1 | 40.0 | 32.6 | 2072 | 16387 |
| 4 | 190 | 8.2 | 10.8 | 38.2 | 32.5 | 1754 | 15539 |
| 5 | 119 | 6.2 | 9.6 | 44.5 | 45.6 | 1605 | 8602 |
| 6 | 120 | 4.7 | 8.6 | 41.7 | 41.7 | 1185 | 8319 |
| 7 | 120 | 4.15 | 8.7 | 42.3 | 39.1 | 1142 | 10045 |
| 8 | 117 | 4.2 | 8.5 | 40.3 | 36.8 | 1079 | 8884 |
| 9 | 165 | 3.0 | 8.1 | — | — | 443 | 16544 |
| 10 | 146 | 2.8 | 8.2 | — | — | 426 | 17674 |
| 11 | 144 | 2.9 | 8.7 | — | — | 266 | 16450 |
| 12 | 133 | 3.2 | 8.8 | — | — | 370 | 14723 |

The values presented in the description and in the Tables were determined in the following way.

NMR samples were placed in tubes under inert gas and, if appropriate, melted. The solvent signals served as internal standard in the $^1$H- and $^{13}$C-NMR spectra and their chemical shift was converted into the values relative to TMS.

The degree of branching in the individual polymer fractions was determined by the method of Holtrup (W. Holtrup, *Makromol. Chem.* 178, 2335 (1977)) coupled with $^{13}$C-NMR.

The density [g/cm$^3$] was determined in accordance with ISO1183.

The determination of the values $M_n$, $M_w$, $M_z$ and of the molar mass distribution $M_w/M_n$ derived therefrom was carried out by means of high-temperature gel permeation chromatography on a WATERS 150 C using a method based on DIN 55672 and the following columns connected in series: 3x SHODEX AT 806 MS, 1x SHODEX UT 807 and 1x SHODEX AT-G under the following conditions: solvent: 1,2,4- trichlorobenzene (stabilized with 0.025% by weight of 2,6-di-tert-butyl-4-methylphenol), flow: 1 ml/min, 500 µl injection volume, temperature: 140° C. The columns were calibrated with polyethylene standards with molar masses of from 100 bis $10^7$ g/mol. The evaluation was carried out by using the Win-GPC software of Fa. HS-Entwicklungsgesellschaft für wissenschaftliche Hard- and Software mbH, Ober-Hilbersheim.

For the purposes of the present invention, the expression MFR (190/21.6), known also as "high load melt flow rate", has been determined at 190° C. under a load of 21.6 kg in accordance with ISO 1133, condition G.

For the purposes of the present invention, the expression MFR (190/2.16) has been determined at 190° C. under a load of 2.16 kg in accordance with ISO 1133, condition D.

In order to determine the reflection properties of the films, gloss measurements were carried out according to ISO 2813 on a reflectometer at impingement angles of 20° and 60°, on at least 5 pieces of film with a thickness of 50 µm.

The haze was determined by ASTM D 1003-00 on a BYK Gardener Haze Guard Plus Device on at least 5 pieces of film 10×10 cm with a thickness of 50 µm.

The clarity was determined by ASTM D 1746-03 on a BYK Gardener Haze Guard Plus Device, calibrated with calibration cell 77.5, on at least 5 pieces of film 10×10 cm with a thickness of 50 µm.

In order to determine the puncture resistance of films under shock loading, the dart drop was determined by ASTM D 1709, Method A on 10 film samples having a thickness of 50 µm.

In order to determine the strength of the films under dynamic loading, dynamic tests were carried out according to DIN 53373, so as to obtain the fracture energy $W_s$ up to the first tear and the total fracture energy $W_{tot}$ for the penetration.

The tensile strength test was performed according to ISO 527 both in machine direction (MD) and at right angle to the machine direction, known as transverse direction (TD)

The tear propagation test, otherwise known as Elmendorf method, was performed according to ISO 6383/2.

The invention claimed is:

1. A polyethylene composition comprising:
   (a) 50 to 89% by weight of a first polyethylene component having:
      (i) a density of from 0.920 to 0.940 g/cm$^3$,
      (ii) a Mw/Mn of from 5 to 30,
      (iii) a Mz of from 50,000 to 500,000 g/mol,
      (iv) a Mz of less than 1 million g/mol, and
      (v) a MFR (190/21.6) between 5 and 100 g/10 min
      wherein the first polyethylene component comprises:
         a multimodal polyethylene wherein the multimodal polyethylene further comprises:
            a plurality of ethylene polymer fractions having distinct molecular weights and co-monomer contents
            wherein the multimodal polyethylene is prepared in a single reactor with a mixed catalyst system comprising at least two different polymerization catalysts, at least one of which is a single site catalyst
            wherein the plurality of ethylene polymer fractions comprise a low molecular weight fraction having an intrinsic viscosity in decalin at 135° C. from 0.6 to 1.2 dl/g and a MFR (190/21.6) between 5 and 100 g/10 min, and a high molecular weight fraction having an intrinsic viscosity in decalin at 135° C. from 2.5 to 5 dl/g; and
   (b) 50 to 11% by weight LDPE having a density of from 0.910 to 0.930 g/cm$^3$, the LDPE being prepared by high-pressure polymerization
      wherein the LDPE has a MFR (190/2.16) between 0.2 and 50 g/10 min.

2. The polyethylene composition of claim 1, wherein the first polyethylene component comprises a bimodal polyethylene including a low molecular weight ethylene homopolymer and a high molecular weight ethylene copolymer.

3. The polyethylene composition of claim 2, wherein said high molecular weight ethylene copolymer comprises 1 to 10% by weight of a comonomer selected from the group consisting of propene, 1-butene, 1-pentene, 1-hexene, 4-methyl-1-pentene, 1-heptene, 1-octene and 1-decene, and mixtures thereof.

4. A film comprising the polyethylene composition of claim 1.

5. The film of claim 4, wherein the first polyethylene component comprises a bimodal polyethylene including a low molecular weight ethylene homopolymer and a high molecular weight ethylene copolymer.

6. A process for producing a polyethylene composition, said process comprising the steps of:
   (a) polymerizing ethylene, optionally with comonomer(s), in a single reactor with a mixed catalyst system comprising at least two different polymerization catalysts, at least one of which is a single site catalyst, to prepare a multimodal first polyethylene component having a density of from 0.920 to 0.940 g/cm$^3$, a Mw/Mn of from 5 to 30, a Mw of from 50,000 to 500,000 g/mol, and a Mz of less than 1 Million g/mol
      wherein the multimodal first polyethylene component comprises a low molecular weight fraction having an intrinsic viscosity in decalin at 135° C. from 0.6 to 1.2 dl/g and a MFR (190/21.6) between 5 and 100 g/10 min, and a high molecular weight fraction having an intrinsic viscosity in decalin at 135° C. from 2.5 to 5 dl/g;
   (b) preparing a second polyethylene component comprising an LDPE having a density of from 0.910 to 0.930 g/cm$^3$, the LDPE being prepared by high-pressure polymerization wherein the LDPE has a MFR (190/2.16) between 0.2 and 50 g/10 min; and
   (c) combining said second polyethylene component and said multimodal first polyethylene component to obtain a polyethylene composition comprising from 50 to 89% by weight of the first polyethylene component and from 50 to 11% by weight of the second polyethylene component.

7. The process of claim 6, wherein the single site catalyst comprises a metallocene.

8. The process of claim 6, wherein the first polyethylene component comprises a bimodal polyethylene including a low molecular weight ethylene homopolymer and a high molecular weight ethylene copolymer.

* * * * *